(No Model.) 6 Sheets—Sheet 1.
H. E. HERR.
MACHINE FOR MAKING EGG FILLERS.
No. 529,172. Patented Nov. 13, 1894.
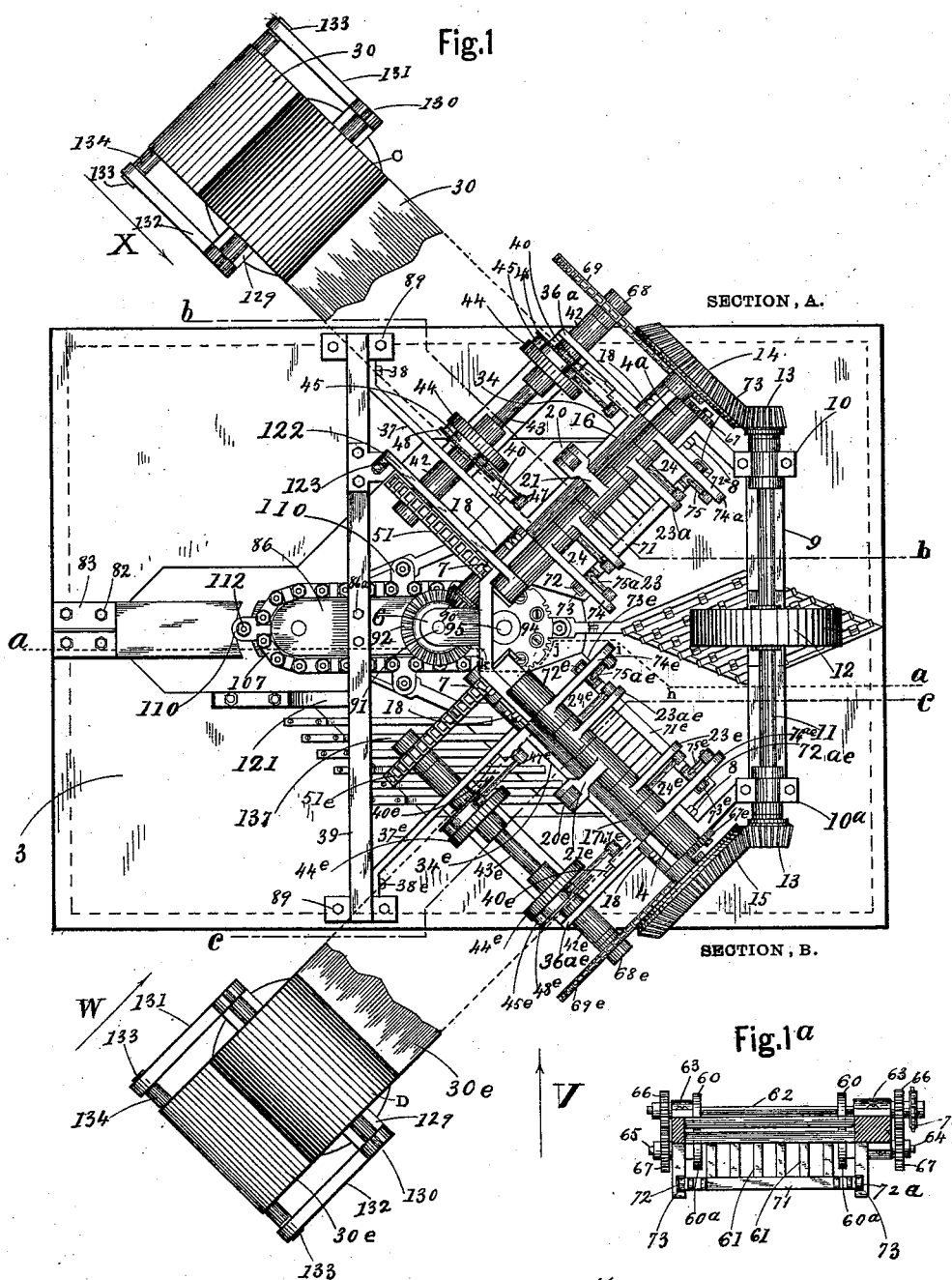
Witnesses. Harvey E. Herr. Inventor.
By James Sangster
Attorney

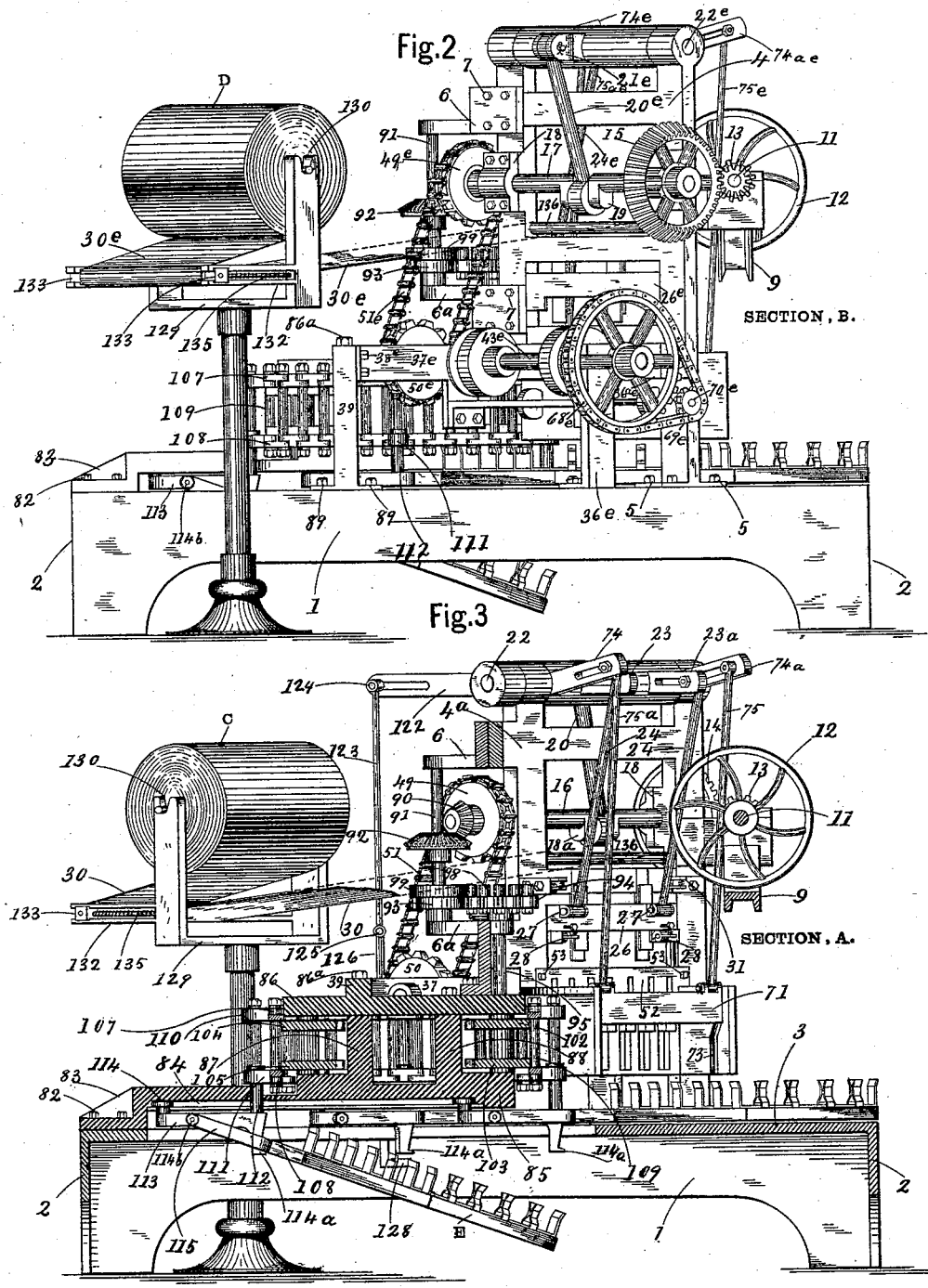

(No Model.)  6 Sheets—Sheet 3.
H. E. HERR.
MACHINE FOR MAKING EGG FILLERS.
No. 529,172.  Patented Nov. 13, 1894.
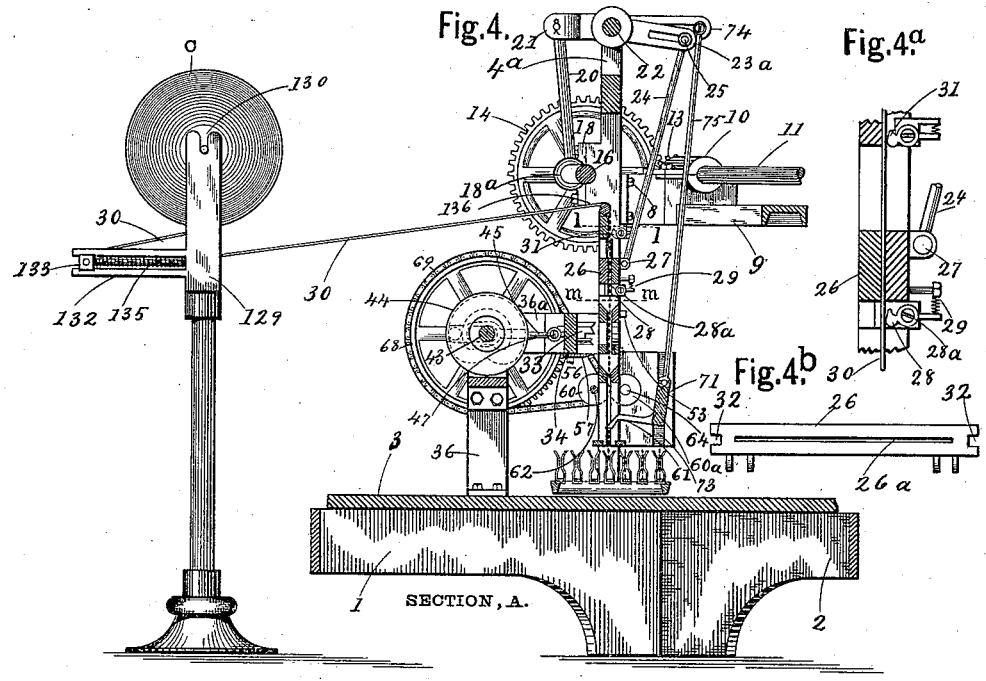
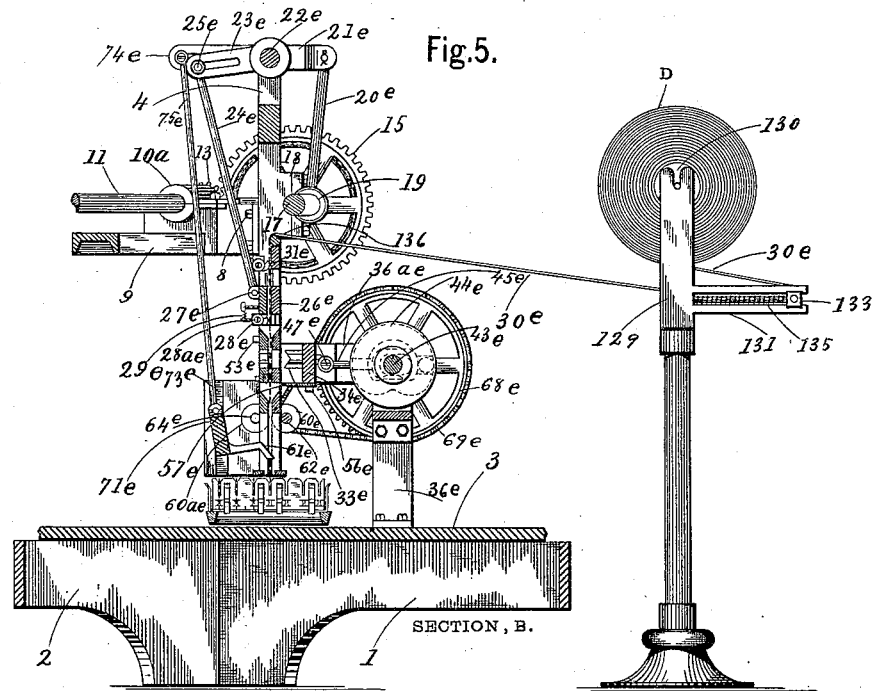
Witnesses,
Harvey E. Herr, Inventor.
By James Sangster, Attorney.

(No Model.) 6 Sheets—Sheet 4.
H. E. HERR.
MACHINE FOR MAKING EGG FILLERS.
No. 529,172. Patented Nov. 13, 1894.
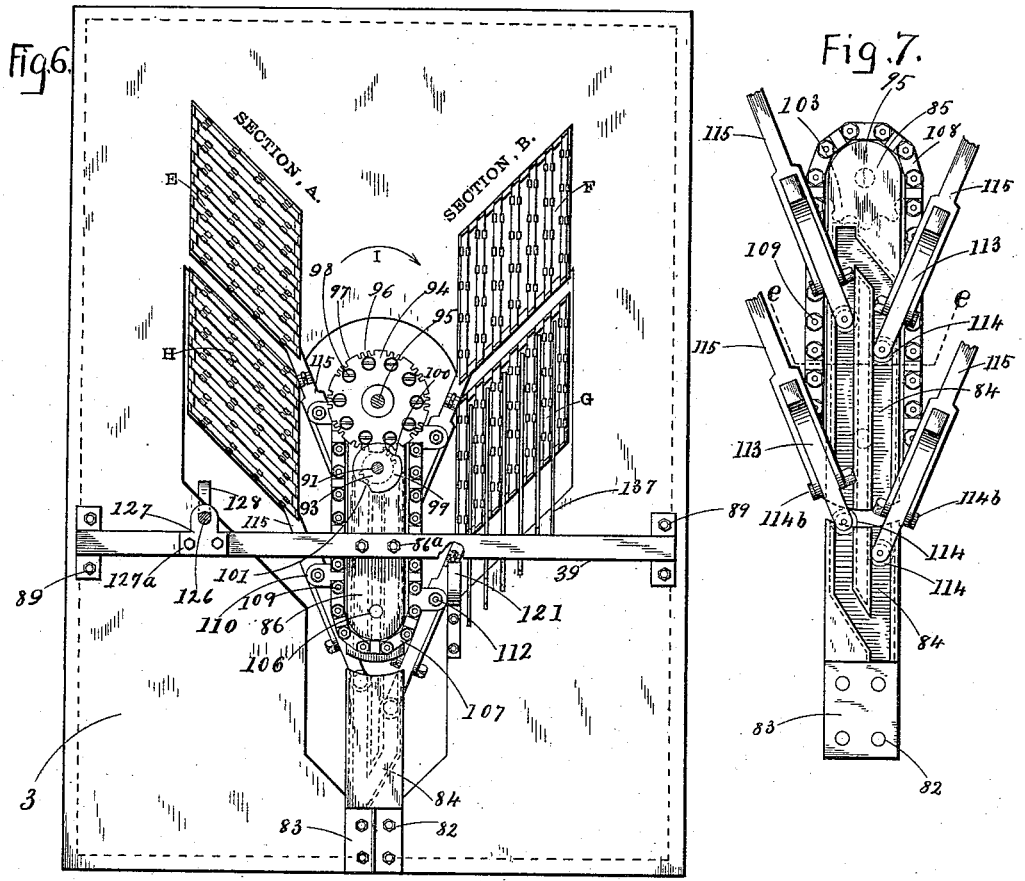
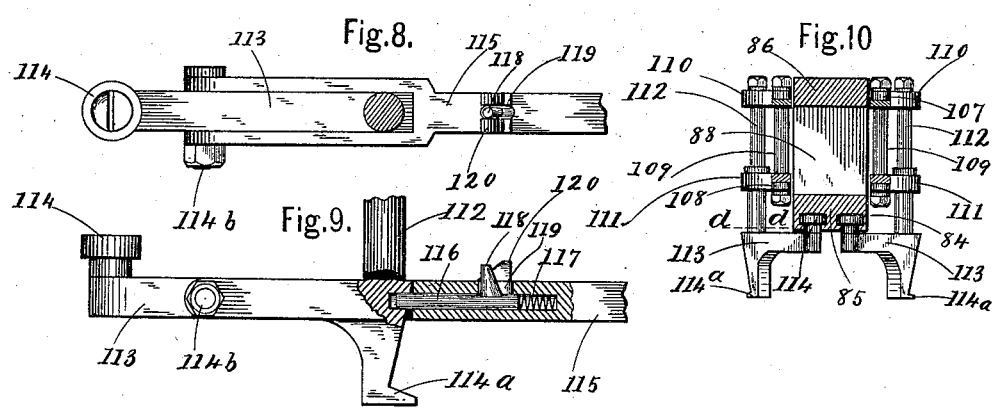
Witnesses. Harvey E. Herr. Inventor.
By James Sangster
Attorney

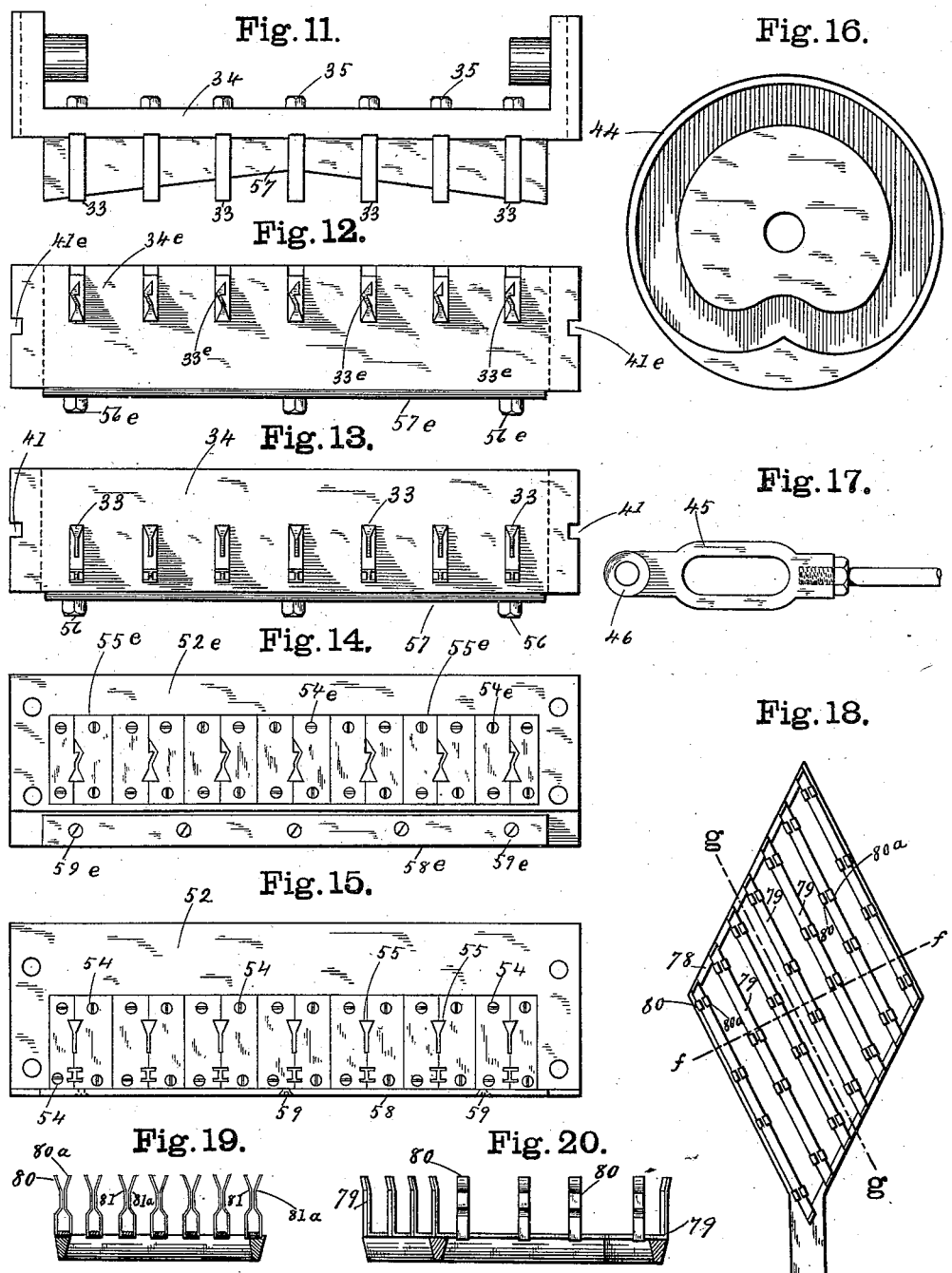

(No Model.) 6 Sheets—Sheet 6.
H. E. HERR.
MACHINE FOR MAKING EGG FILLERS.
No. 529,172. Patented Nov. 13, 1894.
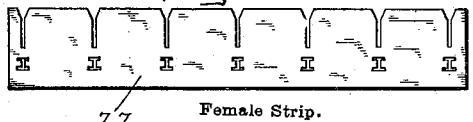
Fig. 20ᵃ  Female Strip.
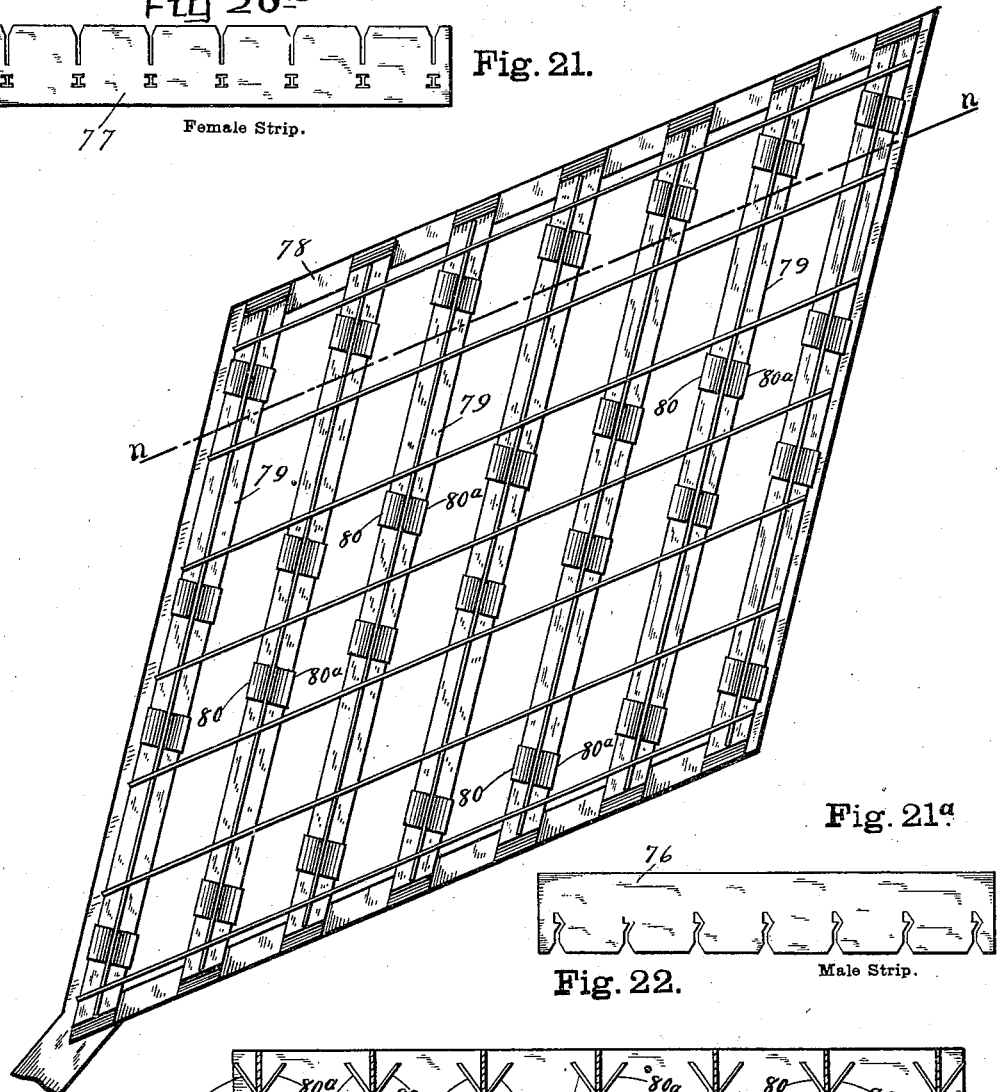
Fig. 21.
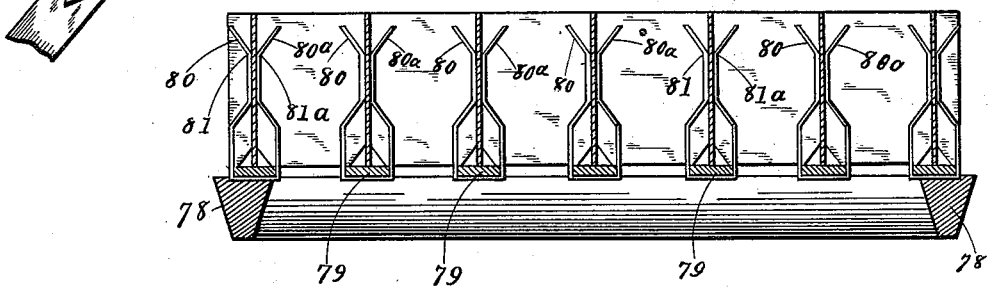
Fig. 21ᵃ  Male Strip.
Fig. 22.
Witnesses. Harvey E. Herr Inventor.
By James Saungster
Attorney.

UNITED STATES PATENT OFFICE.

HARVEY E. HERR, OF DAYTON, OHIO, ASSIGNOR TO THE AMERICAN EGG CASE COMPANY, OF PORT HURON, MICHIGAN.

MACHINE FOR MAKING EGG-FILLERS.

SPECIFICATION forming part of Letters Patent No. 529,172, dated November 13, 1894.

Application filed June 7, 1894. Serial No. 513,756. (No model.)

*To all whom it may concern:*

Be it known that I, HARVEY E. HERR, a citizen of the United States, residing at Dayton, in the county of Montgomery and State of Ohio, have invented certain new and useful Improvements in Machines for Making Egg-Fillers, of which the following is a specification.

My invention relates to machines for making paper trays or fillers in which eggs are packed for transportation and will be fully and clearly hereinafter described and claimed, reference being had to the accompanying drawings, in which—

Figure 1, is a top plan view of the machine complete. Fig. 1$^a$, is a detached horizontal section through the vertical frame 4$^a$, just below the cutting mechanism, showing the two pairs of rubber faced rollers and gearing for operating them, showing also a plan of the beaters, all parts below the beaters being omitted. Fig. 2, is a side elevation looking in the direction of the arrow V, Fig. 1. Fig. 3, is a vertical longitudinal section on or about line $a\,a$, Fig. 1, the line passing longitudinally to the point $h$, from thence diagonally to the point $i$, then longitudinally to the point $j$, and around the wheel 94. From thence it passes transversely to the point $k$, and then longitudinally through the machine, passing under bevel gear wheel 92. Fig. 4, is a sectional elevation on or about line $b\,b$ Fig. 1, looking in the direction of the arrow W, in said Fig. 1, showing the mechanism for feeding, punching and cutting the strip, and for carrying the strip down into position. Fig. 4$^a$, represents a portion cut out of Fig. 4, in or about lines $l\,l$ and $m\,m$, in said Fig. 4. Fig. 4$^b$, is a plan view of the feed bar 26, showing the elongated opening through which the paper passes. Fig. 5, is a sectional elevation on or about line $c\,c$ Fig. 1, looking in the direction of the arrow X, showing similar mechanism on the opposite side of the machine. Fig. 6, is a top plan view of the mechanism below the feeding, punching and cutting mechanism, showing the mechanism for carrying and operating the forms in which the paper strips are set while being formed into a "tray" or egg case. Fig. 7, is an under side view of the form carrying mechanism, showing the cam track and that portion of the tray form arms operated by it. Fig. 8, is a detached enlarged face view of one of the tray-form arms, showing a horizontal section through line $d\,d$, Fig. 10. Fig. 9, is a side elevation of Fig. 8, a portion being broken away to show the spring bolt used during a portion of the operation of the tray-form arm. Fig. 10, is a cross section on or about line $e\,e$, Fig. 7. Fig. 11, is an enlarged plan view of one of the angular punch holding bars. Fig. 12, is a front view of the same, showing the shape of the punch faces for punching the male strip. Fig. 13, represents a front view of the punch holding bar, showing the shape of punch faces for punching the female strip. Fig. 14, represents a face view of one of the die plates, showing the form of dies required for the male strip or for the punches shown in Fig. 12. Fig. 15, represents a face view of the die plate having dies corresponding with the punches shown in Fig. 13 for punching the female strips. Fig. 16, is an enlarged face view of one of the cam wheels for operating the punches. Fig. 17, represents one of the slotted punching bar cam arms, showing also a face view of the friction roller connected therewith. Fig. 18, is a detached enlarged view of one of the tray forms. Fig. 19, represents a section on or about line $f\,f$, Fig. 18, showing a front view of the spring clips. Fig. 20, is also a section on or about line $g\,g$, Fig. 18, cutting substantially at right angles to the line $f\,f$, shown in Fig. 18, showing a side view of the spring clips. Fig. 20$^a$, represents a face view of one of the paper strips used in making the tray or filler and is designated as the female strip. Fig. 21, represents a detached enlarged plan view of one of the tray forms, showing an egg filler or tray in place within the form. Fig. 21$^a$, is a face view of the other paper strip designated as the male strip. Fig. 22, is a section on or about line $n\,n$, Fig. 21, also showing a section through an egg filler or tray, cutting through the same line.

Referring to the drawings in detail, the supporting frame of the machine consists of the sides 1, ends 2 and top 3, all formed in one piece of cast iron, cast iron being preferred because of its cheapness and strength but any suitable material may be used. It is made in the form of a table so as to be easily molded and cast. The two supporting frames 4 and 4ª, are each cast in one piece and bolted to the top of the table by bolts 5. One side only is shown in Fig. 2, and each is set at right angles to the other or at an angle of forty five degrees with the longitudinal sides of the table, substantially as shown in Fig. 1. At the top and bottom of these frames are connecting angle bars 6 and 6ª. These bars are rigidly fastened to the frame pieces 4 and 4ª, by bolts 7. See Figs. 1 and 2. At the front of each vertical frame 4 and 4ª, is bolted by screw bolts 8, a cross-bar 9. See Figs. 1, 2, 3, 4 and 5, particularly Fig. 1. On the cross bar 9, formed in one piece with it, are the boxes 10 and 10ª, in which the driving shaft 11, is mounted, and rigidly secured to the driving shaft is a driving wheel 12.

At each end of the shaft 11, is rigidly secured a bevel gear pinion 13. See Figs. 1, 2, 3, 4 and 5, but shown more clearly in Fig. 1. The pinions 13, gear with the bevel gear wheels 14 and 15, one being rigidly secured to the shaft 16, the other to the shaft 17. See Figs. 1, 2, 3, 4 and 5. These shafts 16 and 17, are mounted in boxes 18, on the vertical frame pieces 4 and 4ª, and are set at substantially right angles to each other. At or near the center of the shaft 16, is a crank 18ª and there is a similar crank 19, on the shaft 17.

The shaft 16, is provided with a connecting-rod 20, the upper end of which is pivoted to the crank arm 21, (see Figs. 1 and 4,) which is rigidly secured to a rock shaft 22, shown in Figs. 3 and 4, which is in boxes at the top of the vertical frame 4ª. At the opposite side of the shaft 22, are rigidly secured two crank-arms 23 and 23ª, each having a connecting rod 24, pivoted by pins 25, one of which is shown in Fig. 4, the opposite ends of the connecting-rods 24, being pivoted to the vertically sliding feed-bar 26, at or about the point 27, shown in Figs. 3, 4 and 4ª. This feed-bar 26, extends horizontally from one side of the frame 4ª, to the other and is mounted in vertical slide-ways in said frame so it can be reciprocated up and down by the operation of the crank 18ª. It is provided with two friction pawls 28, pivoted by pins 28ª, to the feeding bar 26. The opposite ends of the pawls project outward and a spiral spring 29 keeps them in position so as to give the necessary pressure against the paper 30. See Fig. 4ª. Directly above the feed-bar is another pair of friction pawls 31, constructed exactly the same as the pawls 28, springs 29 included, and pivoted to stationary parts of the frame 4ª.

The office of the pawls 28, is to feed the paper 30, downward with the feeding bar, and the stationary pivoted pawls 31, prevent it from being moved backward. The feed bar 26, is provided with a slot or opening 26ª, (see Fig. 4ᵇ,) through which the paper 30, passes. At each end of the feed bar is a groove 32, adapted to fit the vertical slide ways on the frame.

The paper 30, as it is moved down intermittingly or step by step is brought directly in front of the punches 33, (shown in Figs. 4 and 13,) at which point the feed and paper remain stationary long enough for the punches to act.

The punches 33, (of which there are seven,) are rigidly secured to the punch-bar 34, on Sheet 3, see Fig. 4 and Figs. 11 and 13 on Sheet 5, by means of the nuts 35, shown in Fig. 11. Attached to the frame 4ª, and to the table by a vertical-frame piece 36, is a horizontal side frame 36ª, see Figs. 1 and 4, and to the opposite side of the frame 4ª, is a horizontal frame bar 37, having its front end bolted to the frame 4ª, and its rear end bolted by bolts 38 to the transverse supporting bar 39. See Fig. 1. The horizontal frames 36ª and 37, are parallel with each other and are provided with slide ways 40, over which the grooves 41, in the punch bar 34, (see Fig. 13 on Sheet 5,) fit and slide. Mounted on the frame bars 36ª and 37, in suitable boxes 42, is a horizontal shaft 43, on which are rigidly secured two cam wheels 44, shown in Figs. 1 and 4, and an enlarged view of one of them in Fig. 16. The shaft 43 passes through two slotted arms 45, each having a friction roller 46, shown in Fig. 17, which project into the grooved cam in the wheels 44, and have their opposite ends connected by pins 47, (shown in Figs. 1 and 4,) to the punch-bar 34. On one side of each of the arms 45, is a plain circular disk 48, and between the cams 44 and the disks 48, the arms 45, operate and are kept in place.

On the inner end of the shaft 16, is rigidly secured a sprocket wheel 49, shown in Fig. 3, and on the inner end of the shaft 43, is another sprocket wheel 50. A sprocket chain 51, connects the sprocket wheels 49 and 50, together. See Figs. 1 and 3.

Directly in front of the punch bar 34, is the die plate 52, secured in place to the frame 4ª, by bolts 53. Rigidly secured to the die plate 52, by screws 54, is a series of dies 55, corresponding to the punches 33. Shown in Figs. 11 and 13.

On the under side of the punch-bar 34, rigidly secured by bolts 56, is a horizontal knife or cutter 57, the edge of which inclines each way toward the center to give a sliding cut substantially as shown in Fig. 11. The cutter 57, being attached to the punch bar 34, is thus a movable cutter and every time the punches operate against the paper, the cutter 57, moves under the cutting edge 58, which is secured to the under side of the die plate 52, by screws 59, so that every time a strip is punched by the punches the punched strip below it is cut off and drops between two pairs of rubber faced rollers 60 and 60ª, which carry it down and drop it into the form when the beaters 61, act and drive it down in position in the form.

There are two pairs of rubber faced rollers, 60 and 60ᵃ. The rollers 60 are mounted on a shaft 62, set in boxes 63. See Figs. 1ᵃ and 4. One roller 60ᵃ, is rigidly secured to a short shaft 64, mounted in bearings in the frame 4ᵃ. The other roller 60ᵃ, is mounted in a similar manner on a shaft 65. The shafts 64 and 65, and 62, are connected together by gear wheels 66 and 67, see Fig. 1ᵃ, which cause them and their rubber faced rollers to move together. They receive their rotary motion by means of a large sprocket gear wheel 68, mounted on the shaft 43, which carries a sprocket chain 69, connecting with the sprocket pinion 70, on the shaft 62.

The mechanism for driving the paper strips 30, down to their proper position in the form after they leave the rubber faced rollers, consists of a series of beaters 61. They are all secured to or form a part of a cross-bar 71, which extends to each inner side of the frame 4ᵃ, and two friction rollers 72 and 72ᵃ, are pivoted to each end of said cross-bar which extends into the cam grooves 73. See Figs. 1 and 1ᵃ and 4. The form of the cam grooves 73, is such that as the bar 71 moves up, the beaters are thrown backward so as to be out of the way of the paper strip as it passes down from the rubber faced rollers, and as the bar 71, passes downward the beaters are moved forward over the strip and thereby catch over it and press it down to the proper point in the form. The beaters receive their proper vertical movements by means of two arms 74 and 74ᵃ, which are rigidly secured to the rock-shaft 22. To the arms 74 and 74ᵃ are pivoted the connecting-rods 75 and 75ᵃ, which have their opposite ends pivoted to the beater bar 71.

The vertical supporting frame 4ᵃ, and the mechanism supported and carried by it is that portion of the machine in which the female trrip is made and presented to the tray form, so that strip with which the punches 33 and dies 55, are used.

For convenience I will divide the machine into two sections, all that part connected with the frame 4ᵃ, being designated as "section A," and the parts connected with the frame 4, as "section B."

In section B, as all parts of the mechanism are identical with corresponding parts in section A, I will designate each corresponding separate part with the same number having the letter "e," in addition, to designate it from the same parts in section B. The connecting rod 20ᵉ, the upper end of which is pivoted to the crank arm 21ᵉ, see Figs. 1 and 5, is secured to the rock shaft 22ᵉ, as in section A, and so with all the other parts in this section, the only difference being in the punches and dies for punching the male strip 76. These paper strips are shown in Figs. 20ᵃ and 21ᵃ, Fig. 20ᵃ, showing the female strip 77, and Fig. 21ᵃ, the male strip.

The form in which the strips composing a tray are placed one after the other, consists of a supporting diamond shaped frame 78, having seven cross-bars 79, secured to the frame 78, parallel with each other. See Figs. 18, 21 and 22. On each bar 79, is secured a series of spring clips consisting of two spring bars 80 and 80ᵃ, both made in the same form, the lower portions being securely attached to the bars 79, in any well known way, the two upper portions inclining outward from each other at 81 and 81ᵃ to allow a free opening for the strips to enter.

On the base or table 3, is secured by bolts 82, a plate 83, which projects upward far enough to allow room for the tray form supporting arms to pass under. Underneath the plate 83, is a portion of the cam track 84, shown in the inverted view Fig. 7, and shown also in section in Fig. 3. The remaining portion of the cam track extends under the plate 85. This plate 85, is suspended from the bar 39, and its cross plate 86, by bolts 86ᵃ, which connect to the upright portions 87 and 88, of said plate, the bar 39, and plate 86, which forms a part of it, being bolted to the base or table 3, by bolts 89. See Figs. 1, 2 and 6. The top of the plate 86, is bolted to the angle plate 6ᵃ. On the inner end of the shaft 16, is a bevel gear wheel 90. A vertical shaft 91, is mounted in suitable boxes on the angle plates 6 and 6ᵃ. See Figs. 2 and 3. On the vertical shaft 91, is rigidly secured a bevel wheel 92, which gears with the bevel gear wheel 90. On the shaft 91, is secured a mutilated gear pinion 93, which gears with a mutilated gear wheel 94. The mutilated gear pinion is provided with three teeth on each side directly opposite each other. See plan view in Fig. 6, in which it is shown in dotted lines. A side elevation of this pinion is also shown, in Figs. 2 and 3. A vertical shaft 95, is mounted in boxes on the angle plate 6ᵃ, plate 86 and plate 85. The large mutilated gear 94, is rigidly secured to this shaft 95. The construction of the mutilated gearing and stops is as follows, (reference being had to Fig. 6:) The large gear 94, is provided with a series of pairs of gear teeth 96, around the periphery leaving blank portions 97, of the periphery between each pair of teeth and mounted on the upper side of the wheel is a corresponding number of friction rollers 98, shown in Fig. 3 as well as in Fig. 6. On the top of the mutilated gear pinion, on the same shaft is rigidly secured a disk 99, having two curved depressions 100 and 101, on its periphery directly opposite each other. See Fig. 6. These depressions 100 and 101, are deep enough to allow the friction rollers 98, to pass the disk 99, as the mutilated pinion 93, turns the mutilated gear wheel 94, intermittingly. After a friction roller passes out from one of the depressions in the disk the unbroken peripheral face of the disk between the depressions 100 and 101, comes in contact with two of the friction rollers 98, and thereby locks the mutilated gear wheel 94, so that it remains stationary until the other depression in the face of the disk allows another friction roller to pass, which operation is intermittingly repeated while the machine is in action.

Mounted on the vertical shaft 95, and rigidly secured to it is a pair of sprocket wheels 102 and 103, located between the plates 85 and 86, shown in Fig. 3. At the opposite end and between the plates 85 and 86, is another similar pair of sprocket wheels 104 and 105, mounted on the shaft 106. A plan view of one of these sprocket wheels is shown by dotted lines in Fig. 7, the one secured to the shaft 95.

The sprocket chain is shown in several figures, for instance, Figs. 2, 3, 6, 7 and 10. It is made in the well known way for a sprocket chain, in an upper and lower portion 107 and 108, joined together by pivot bars 109, the two portions being separated from each other sufficiently to avoid any lateral movement. The sprocket wheels above described carry this sprocket chain, and operate the forms. The number of chain links must correspond with the number of bars in the four tray forms. Consequently there should be twenty-eight links in the upper portion 107 and a corresponding number in the lower portion 108. These links are joined together pivotally by twenty-eight pivot bars 109. Every seventh link is provided with a lateral extension piece 110 and 111, thereby making four in each portion. They are arranged in pairs one directly above the other. See Figs. 3 and 6. In each pair of extension pieces 110 and 111, is mounted a vertical shaft 112, to each of which is rigidly connected one portion of a tray form arm 113, see Fig. 10, at one end of which is a friction roller 114. At the opposite end is a downward projecting hook shaped portion 114$^a$. See Figs. 9 and 10. To the portion 113, is pivoted by pin 114$^b$ at a point between the friction roller 114, and the vertical shaft 112, (reference being had to Fig. 3, and to the enlarged views Figs. 8 and 9,) one of the tray form arms 115, of which there are four corresponding with the number of pairs of extension pieces 110 and 111. To the ends of each of the arms 115, is rigidly secured the tray forms heretofore described, consisting of the diamond shaped frame 78, bars 79, and spring clips 80 and 80$^a$. The object of this construction is to provide the means for moving the forms carrying the paper receiving clips 80 and 80$^a$, intermittingly, and holding them during each pause long enough for a strip of paper to be deposited in the clips and then moving the form the exact distance required and again holding it during the same period or until another strip of paper is deposited in the next series of clips, and so on until the form is filled with seven parallel strips of paper. The distance from the last series of strips in a form to the first series of strips, in the form following after, being the same, as the distance between the strips on a form, the operation is thus continuous from one form to another.

In each tray form arm 115, is a spring bolt 116. A spring 117, keeps the bolt in its normal position. Rigidly secured to the bolt is a substantially upright portion 118, projecting up through a slot 119, in the tray arm. See the enlarged views, Figs. 7 and 8. On each side of the slot 119, is an inclined portion 120, which inclines upward toward the tray.

121, represents a trip-bar for tripping the mechanism for lowering the tray, the use of which will be described farther on.

To the rocker shaft 22, is rigidly secured an arm 122 having a connecting rod 123, pivoted to it by a pin 124. The opposite end of the connecting rod 123, is pivoted by a pin 125, to a plunger-rod 126, shown in Fig. 3.

Referring now to Fig. 6, the lower end of the plunger rod passes through a holding piece 127, which is secured to the supporting bar 39, by bolts 127$^a$. The plunger-rod after passing through the holding piece 127, passes down through the table top 3, and is provided with a horizontal portion or foot 128. This foot 128, is shown in Figs. 3 and 6.

The paper rolls are supported upon movable holders C and D, see Figs. 1, 2, 3, 4 and 5, each of which consists of a standard having a holding frame 129, adapted to receive and hold the roll bearings 130. Two slotted arms 131, 132 project out horizontally and carry boxes 133, in which is mounted a friction roller 134. Interposed between the slotted arms of each of the holding frames and their boxes 133, is a spiral spring 135, for holding the paper with a yielding force as it is drawn into the machine.

The operation of the machine is as follows: Reference being had to section A, the paper 30 being fed from the roll is carried back over and down around the friction roller 134, and from that to and over a friction roller 136, and from thence down into the feeding mechanism. It is now carried down by the reciprocating feeding mechanism and stops first long enough to receive the punching. It then is carried down far enough to be cut where it remains stationary long enough for the cutter to operate. (During this time another uncut strip above is being punched so that both the cutter and punches operate together.) The length of feed corresponds to the width of strip desired. The strip after being punched and cut off drops by its own gravity down into the rubber feed rollers 60 and 60$^a$, by which it is carried down far enough to be caught by the beaters 61, which force it down in place in the form thereby placing and locating the first strip, which operation is continued until seven strips have been deposited; the form being thus filled, or enough for a half completed filler. This operation is continuous from one form to another as heretofore described, but we will follow this one form from the time the first strip is deposited until the seventh strip is in place, and the form changes its position and is presented to receive the strips from the mechanism in section B, and the filler completed. It will be observed that when a form is in position to receive the strips from section A, the several series of paper clips 80 and 80ª, and the bars 79, upon which they are secured, are exactly parallel with the feed mechanism, the opening 26ª through which the paper passes, and the frame 4ª, and at the time a strip is deposited, a row of paper clips are directly under the frame in position to receive it, substantially as shown in Fig. 4. The paper receiving clips being now all filled by the seven strips above mentioned, the form, which I will designate for the purpose of illustration, the form E, (the other forms being designated as F, G and H,) see Fig. 6, during the continuous operation of the machine and while H, is receiving the strips from section A, is being moved step by step in the direction of the arrow I, shown in Fig. 6, until it takes the position of form F, in section B. The forms E, F, G and H being all connected to the one sprocket chain are all moved together and never change their relative positions with reference to each other. The form E, now in the position of the form F, receives the strips of paper from section B, or male strips which are of a different construction from the strips made in section A, so that they do not go into receiving clips, but have a series of openings punched in them extending from the lower side upward far enough to allow the strip to be forced down cross-wise over the other strips. The strips from section B, are also provided with a series of hooks, corresponding with the number of openings in the strips from section A, which engage with said openings and thereby hold the strips together, the construction of such strips for this purpose being well known. The mechanism in section B, receives the paper from the roll on the stand D, and operates exactly in the same and is constructed the same as in section A. The paper is fed down into the machine, punched, cut off, caught by rubber faced rollers and then by beaters 61ᵉ, which all operate exactly in the same way, the only difference being in the shape of the punches which punch the male strip. The form E, as soon as it becomes filled with cross strips, reaches the position of form G. In passing to the position of the form G, the form E, passes under the stationary bars 137, so that when it is in the position of the form G, the bars 137, will be in between the bars 79, substantially as shown in Fig. 6. When the form E, reaches the position of G, the vertical portion 118, of the spring bolt 116, comes in contact with the trip-bar 121, which causes the bolt to move back as the form moves the other way until the trip-bar 121, strikes the inclined portion 120, which operation throws the form down in the position shown in Fig. 3, where it is designated by the letter E. When the form thus drops the completed filler remains on the bars 137, from which it can be easily removed by hand. The form E, now swings under its operating mechanism step by step, to substantially the position of the form H, where it swings over the suspended foot 128, which rises and brings the form to its starting position.

All the forms E, F, G and H, being constructed the same and operated by similar mechanism, pass through exactly the same conditions above described for the form E, and all are operated, step by step, at the same time, all of said steps being exactly the same length, including the step from one form to another, so that a completed strip is deposited in its required position at every step above set forth, even while one form is leaving and another is moving into its place, which operation is continued until a filler or egg case is completed.

The steps above mentioned refer only to the time the forms are receiving strips, as the forms are then guided by the straight sides alone of the cam groove 84.

No strips are deposited in a form when it is passing around the end of the cam groove 84, or where a form passes from the position of E, to the position of F, or from the position of G to H.

It will be noticed that the four arms, composed of the parts 113 and 115, being pivoted by shaft 112, and having at their ends friction rollers 114, which fit in the cam groove 84, and are controlled and guided thereby, are moved only in a straight line while the friction rollers 114, are in the straight sides of the said cam groove, but when the sprocket chain carries them around from one side to the other, the friction roller passes through the angular ends of the cam groove and guides them around in their proper direction, as will be seen by reference to Figs. 6 and 7, a portion of the cam groove 84, being shown by dotted lines in Fig. 6.

The action or direction of movement of the several parts will appear to be reversed in Fig. 7, which represents a reverse side for the purpose of showing the cam groove more clearly.

I claim as my invention—

1. In a machine for making egg-fillers, the combination with a supporting base or table, of two vertical supporting frames each set at an angle of forty five degrees, or thereabout, to a line drawn longitudinally through the supporting base or table, or substantially at right angles to each other, mechanism for receiving and feeding the female strip of paper, means for punching it, and cutting it off from the main strip, rubber faced rollers for receiving and feeding the strip after being cut, a receiving form, and beaters that force the strip therein, means for moving the form after receiving the female strip to a position to receive the male strip, mechanism for receiving and feeding the male strip of paper, punching it, cutting it off from a main strip, delivering it to the rubber faced rollers and to a series of beaters that force it down cross-wise and into the female strip openings while located in said form, substantially as described.

2. In a machine for making egg-fillers, a supporting base or table provided with a vertical supporting frame set at an angle of forty five degrees or thereabout; to a line drawn longitudinally through the base or table, in combination with a receiving form, means for operating it, mechanism for receiving and feeding the female strip of paper, and for punching, cutting and delivering the same to the receiving form, means for moving said form and presenting it to a second vertical supporting frame located at right angles to the first supporting frame to receive the male strip, means for receiving, feeding, punching, cutting and delivering the male strip of paper, and beaters that force it down cross-wise and into the openings of the female strips after they have been deposited in said form, substantially as described.

3. In a machine for making egg fillers, a supporting frame, means for feeding, punching and cutting a filler strip and dropping it, and rubber faced rollers for carrying it down to the beaters, in combination with a series of beater fingers connected to a cross-bar adapted to move in vertical slideways and pivoted to a connecting rod pivoted to an arm on the rocker shaft for the purposes described.

4. A machine for making egg-fillers consisting of the following elements, a base or table upon which the supporting frames are secured, two vertical supporting frames, set so their delivering sides are at right angles facing toward each other, mechanism located on one frame for receiving, feeding, punching, cutting and delivering a strip of paper, a horizontally movable receiving form, means substantially as above described for moving said receiving form step by step in a horizontal plane until filled with the first series of egg filler strips, means for moving it with its series of parallel strips to the second supporting frame for receiving the completing series of strips obliquely across the first series of strips, mechanism located on the second supporting frame for feeding, punching, cutting and thus delivering the strips to the form, means for moving the form step by step until filled, means for relieving the form from the now completed filler and then swinging the empty form downward and carrying it across under its operating mechanism in a horizontal plane and raising it to the starting point in a position to repeat the operation, substantially as described.

5. In a machine for making egg-fillers, the combination with a mutilated gear wheel mounted on a vertical shaft and consisting of a series of pairs of gear teeth, having a plain peripheral space intervening between the gear teeth, a series of vertically pivoted friction rollers equal in number to the pairs of gear teeth, a mutilated gear pinion mounted on a vertical shaft and having two series of three gear teeth, one directly opposite the other, each series of teeth adapted to gear in with the teeth in the large mutilated gear wheel, a disk mounted directly above the mutilated pinion rigidly secured to the same shaft and provided with two depressions on its periphery directly opposite each other and large enough to allow the friction rollers to pass by as the mutilated gear wheels operate in their engagement with each other, and a sprocket chain mounted on pinions, the driving pinion of which is mounted on the same shaft with the large mutilated gear wheel, a grooved cam track located lengthwise below the sprocket gear chain, and an even number of egg-filler or tray forms pivoted at equal distances apart on said chain and having at each of their rear ends a friction roller in said cam track, whereby an intermittent step by step movement is given to the form substantially as described.

6. In a machine for making egg-fillers, the combination with an oblong inverted grooved cam track, of a horizontal sprocket chain mounted on sprocket wheels on vertical shafts, one of which is the driving shaft, a series of egg-filler or tray forms having their arms pivoted at equal distances apart on said sprocket chain and the rear ends of said arms pivoted to friction wheels in engagement with the grooved cam, and means substantially as above described for giving the sprocket chain an equal step by step movement, for the purposes described.

7. In a machine for making egg-fillers, a diamond shaped filler form rigidly secured to a forked arm having its opposite end pivoted horizontally to a vertically pivoted arm 113, means for giving it a horizontal swinging movement consisting of a stationary oblong grooved cam, in combination with a horizontal sprocket chain mounted on sprocket gear wheels to which chain the arm 113 is pivoted by a vertical shaft 112, means for operating said chain, a tripping mechanism carried by the forked arm 115, a stationary bar 121, for operating it as the arm moves under it as it is carried around by the sprocket chain, for dropping the egg filler form every time it comes around to that point, substantially as described.

8. In a machine for making egg fillers, the combination of a diamond shaped filler form, a forked arm to which it is secured having its opposite end pivoted horizontally to a vertically pivoted arm 113, having a friction roller at its opposite end and an oblong grooved cam in which the friction roller operates, so as to give the form a horizontal swinging movement, means substantially as above described, for dropping the form, a vertical pivoted bar 112, secured to the arm 113, a horizontal sprocket chain to which the pivot bar is connected, means for operating the sprocket chain, the forked bars 137, over which a completed filler passes as the form passes under and drops, leaving the filler thereon, substantially as described.

9. In a machine for making egg fillers, the combination of a diamond shaped filler form, a forked arm to which it is secured having its opposite end pivoted horizontally to a vertically pivoted arm 113, having a friction roller at its opposite end and an oblong grooved cam in which the friction roller operates so as to give the form a horizontal swinging movement, means substantially as above described for dropping the form, a vertical pivoted bar 112, secured to the arm 113, a horizontal sprocket chain to which the pivot bar is connected, means for operating the sprocket chain, a foot 128, connected with a plunger rod and means for operating the same the moment the filler form passes over on to the foot, for lifting said form up to its normal height for receiving filler strips, substantially as described.

10. In a machine for making egg-fillers, the combination of the strip delivery mechanism carried by the two supporting frames, with a series of vertically pivoted arms, a diamond shaped strip receiving form secured to one end of each of said arms and a friction roller at each opposite end, an oblong grooved cam in which said rollers operate, and mechanism substantially as above described for giving the said forms their horizontal swinging movements, whereby one side of each of the diamond shaped strip receiving forms is successively presented to the delivery mechanism located on one supporting frame until filled with a parallel series of strips, then the other side of said form diverging from the same point is carried horizontally over to the other supporting frame in position to receive a series of cross strips deposited obliquely thereon, substantially as described.

HARVEY E. HERR.

Witnesses:
C. A. HERR,
A. A. HERR.